(No Model.)
J. BROOKS.
PRINTING MACHINE.
No. 322,090. Patented July 14, 1885.
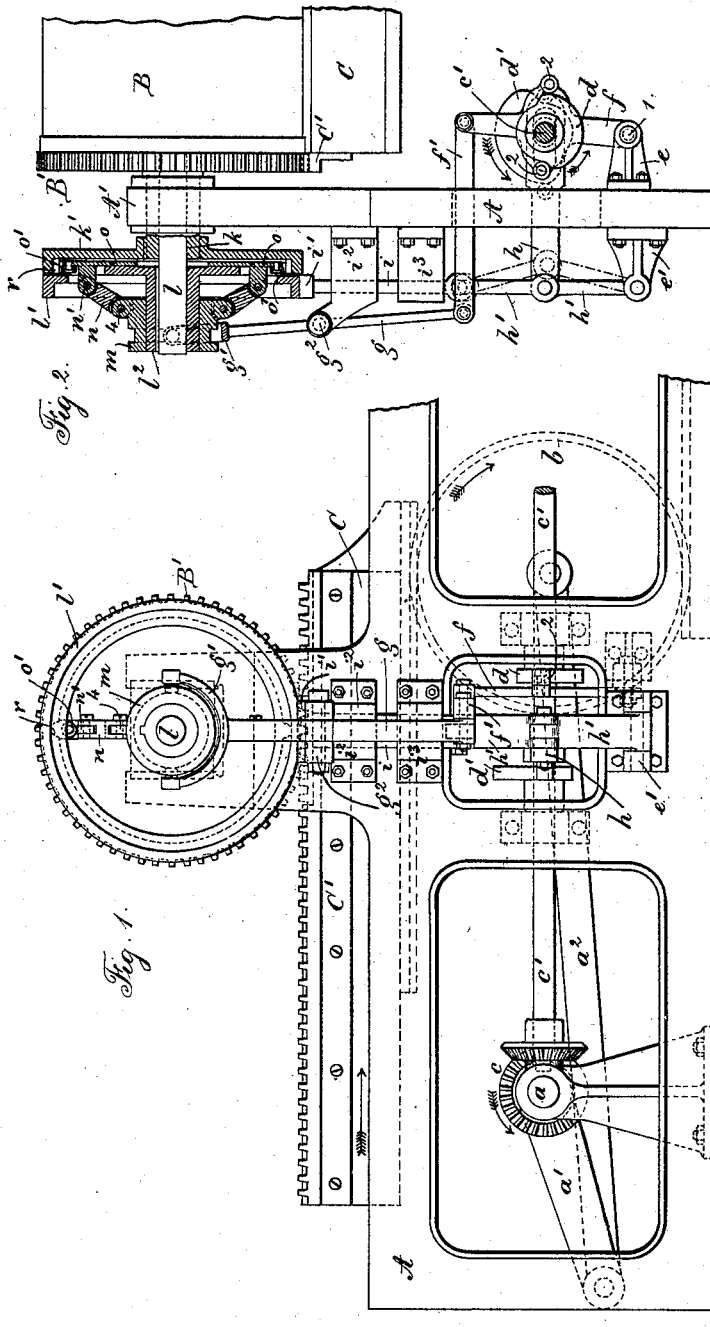
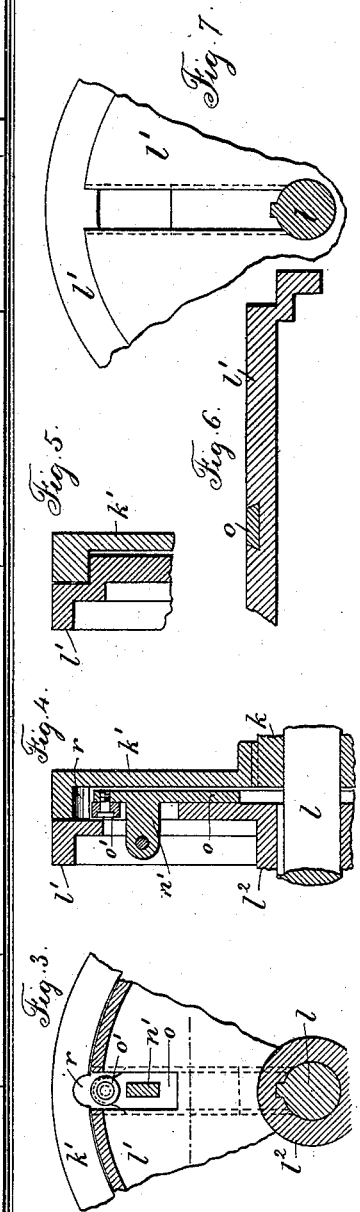
Witnesses
J. Staib
Chas. H. Smith
Inventor:
John Brooks
per Lemuel W. Serrell
atty

UNITED STATES PATENT OFFICE.

JOHN BROOKS, OF PLAINFIELD, NEW JERSEY.

PRINTING-MACHINE.

SPECIFICATION forming part of Letters Patent No. 322,090, dated July 14, 1885.

Application filed March 2, 1885. (No model.)

*To all whom it may concern:*

Be it known that I, JOHN BROOKS, of Plainfield, in the county of Union and State of New Jersey, have invented a certain new and useful Improvement in Printing-Machines, and the following is declared to be a description of the same.

My invention relates to improvements in printing-presses, and especially to presses employed for lithographic printing; and the object of my invention is to stop and securely hold the impression-cylinder at the end of the movement of the reciprocating bed in one direction while the bed is moving in the other direction, and then to release the cylinder so that it may be revolved with the bed as it moves in the other direction, when the printing takes place. I employ in connection with the impression-cylinder the reciprocating bed and its rack, a toothed wheel which, instead of being connected to the cylinder and moving with it, is itself mounted upon a sleeve, and said sleeve surrounds the shaft of the impression-cylinder, and the same journal-box in the frame of the machine answers for both. There are two disks, one of which is connected to the sleeve of the toothed wheel and the other to the shaft of the impression-cylinder. This latter disk is grooved for slides carrying rollers, and there are lugs upon the slides passing through mortises in the disk, and links hinged to the lugs and connected to a sliding collar. This sliding collar is moved through the medium of a cam, link, and levers back and forth upon the hub of the disk, and gives motion to the aforesaid slides to force their rollers into notches in the disk that is connected by the sleeve to the gear-wheel and cause the toothed wheel and impression-cylinder to move together; or said slides are withdrawn and the disks disconnected, and a brake-bar and brake-shoe are brought into contact with the periphery of the disk upon the cylinder-shaft, and said disk, shaft, and the impression-cylinder are held during the movement of the bed in one direction; but during this time the other disk, its sleeve, and the toothed wheel are free to be moved by and with the bed and rack.

In the drawings, Figure 1 is a side elevation of so much of a printing-press as is necessary to show my improvement. Fig. 2 is a partial end view and section of the same. Fig. 3 is a detached view of part of the disk and one of the slides in larger size. Fig. 4 is a section of the same. Fig. 5 is a section of the locking-rims of the disks. Fig. 6 is a section of one of the slides and the disks $l'$, and Fig. 7 is a view of part of the inner face of the disks $l'$.

A represents the frame of the machine; A′, the bearing or journal-box; B, the impression-cylinder; B′, the toothed wheel; C, the reciprocating bed, and C′ the rack upon the same.

The driving-shaft $a$ is mounted in suitable bearings upon the frame of the machine, and provided with the crank $a'$. The connecting-rod $a^2$ extends from the pin of the crank $a'$ to the axle of the toothed wheel $b$, that gives motion to the reciprocating bed C in the usual manner.

There are bevel-wheels $c$, one of which is upon the shaft $a$, and the other upon the cam-shaft $c'$, which shaft $c'$ is mounted in suitable bearings upon the frame of the machine, and upon this shaft are the cams $d$ $d'$.

There are brackets, $e$ $e'$, upon the frame A, one upon each side thereof. The rocking lever $f$ is pivoted at 1 to the bracket $e$, and there are rollers 2 upon said lever, against which the cam $d$ acts to move the lever $f$. Pivoted to said lever $f$ is the link $f'$. The lever $g$ is connected at its lower end to the link $f'$, and its upper end is formed with a yoke, $g'$, which operates the grooved collar $m$, and said lever is pivoted at $g^2$ to the bracket $i^2$.

The bar $h$ is connected with the toggle-arms $h'$, and upon said bar $h$ there are rollers against which the cam $d'$ acts to operate the toggle-arms $h'$. One of these toggle-arms is pivoted to the bracket $e'$, and the other to a brake-bar, $i$, sliding in brackets $i^2$ $i^3$, and having upon its upper end the brake-shoe $i'$.

Connected to and extending from the toothed wheel B′ is the sleeve $k$, and the shaft $l$ of the impression-cylinder B passes through this sleeve, and the bearing A′ in the frame of the press supports both the sleeve and the shaft that is within it.

Upon the outer end of the sleeve $k$ is secured the flanged disk $k'$, and there is a flanged disk, $l'$, with a hub, $l^2$, keyed upon the shaft $l$, and these disks are provided with rims that interlock closely together, as shown in Fig. 5.

Upon the hub $l^2$ there is a sliding grooved collar, *m*, into the groove of which the ends of the yoke *g'* are received.

There are lugs upon the collar *m*, and links *n* are pivoted at 4 to them, and there are lugs *n'* pivoted to the other end of the links *n*. These lugs *n'* are formed with the slides *o*, which slides are received into dovetailed grooves cut in the inner faces of the disk *l'*, and at the ends of said slides *o* there are studs and rollers *o'*. In the inner surfaces of the flange of the disk *k'* there are notches that receive the rollers *o'* when the slides are projected to lock the disks together.

The operation of the parts is as follows, presuming the bed C to be moving in the direction of the arrow, Fig. 1: With the parts in the position shown in Figs. 1 and 2, the impression-cylinder is held stationary during the movement of the bed in the direction of the arrow, because the shaft *l* and disk *l'* are rigidly held by the brake-shoe *i'* in contact with the periphery of the disk *l'*, which at this point is preferably flattened, and the rollers *o'* are withdrawn from the notches *r*. The disk *k'* and its sleeve *k* are free and revolve with the toothed wheel B' as the rack *c'* moves beneath such wheel, it being understood that the toothed wheel B' is continually in gear with the rack *c'*, and is revolved with it whether the impression-cylinder B is moving or not. When the bed C reaches the end of its stroke in the direction indicated by the arrow, the cams *d d'* act simultaneously upon the mechanism described, releasing the brake-shoe *i'* from the disk *l'*, and moving the collar *m*, links *n*, and slides *o*, and forcing the rollers *o'* into the notches *r*, and thus locking the disks *k'* and *l'* together, so that during the return movement of the bed the impression-cylinder is revolved by the rack *c'* as usual in printing. When the bed returns to the position shown in Fig. 1, the cams *d d'* act to bring the brake-shoe into contact with the disk *l'*, and to move the collar *m* and remove the roller *o'* from the notches *r*, and thus to lock the impression-cylinder and release disk *k'* and wheel B', and permit the movements to be repeated.

I claim as my invention—

1. In a printing-press, the combination, with the impression-cylinder B, toothed wheel B', bed C, and rack C', of the sleeve *k* and disk *k'*, the disk *l'* and hub *l*², the collar *m*, links *n*, lugs *n'*, slides *o*, rollers *o'*, the cam-shaft *c'*, cams *d d'*, rocking lever *f*, link *f'*, lever *g* and yoke *g'*, the slide-bar *h*, toggle-arms *h'*, brake-bar *i*, shoe *i'*, and mechanism, substantially as specified, for imparting motion to the parts, as set forth.

2. In a printing-press, the combination, with the impression-cylinder B, toothed wheel B', bed C, and rack C', of the sleeve *k* and disk *k'*, with a notched rim, the disk *l'* and hub *l*², the collar *m*, links *n*, lugs *n'*, slides *o*, and rollers *o'*, and mechanism, substantially as specified, for operating the parts in locking the cylinder B and disks *l'* and *k'* together during the movement of the bed in one direction and disconnecting the impression-cylinder, so that it remains stationary during the movement in the other direction, substantially as set forth.

3. In a printing-press, the combination, with the impression-cylinder B, toothed wheel B', bed C, and rack C', and mechanism, substantially as described, for moving the bed, of the bevel-wheel *c*, cam-shaft *c'*, cams *d d'*, rocking lever *f*, links *f'*, lever *g*, and yoke *g'*, the slide-bar *h*, toggle-arms *h'*, brake-bar *i*, brake-shoe *i'*, and mechanism, substantially as specified, for locking the toothed wheel and impression-cylinder together or disconnecting them, substantially as set forth.

4. In a printing-press, the combination, with the impression-cylinder B, toothed wheel B', bed C, and rack C', of the sleeve *k*, connected to the toothed wheel B, the disk *k'*, keyed to said sleeve, the shaft *l*, the hub *l*², and disk *l'*, secured to the shaft, the slides *o* and rollers *o'*, and mechanism, substantially as specified, for moving the slides to lock or unlock the shaft of the impression-cylinder and the gear-wheel, as set forth.

Signed by me this 14th day of February, A. D. 1885.

JOHN BROOKS.

Witnesses:
  GEO. T. PINCKNEY,
  HAROLD SERRELL.